United States Patent [19]

Foster

[11] 4,058,866
[45] Nov. 22, 1977

[54] MACHINES FOR HANDLING AND ASSEMBLING FASTENERS AND WASHERS

[75] Inventor: Graham Terence Foster, Birmingham, England

[73] Assignee: Linread Limited, Birmingham, England

[21] Appl. No.: 687,373

[22] Filed: May 17, 1976

[30] Foreign Application Priority Data

June 10, 1975 United Kingdom .............. 24916/75

[51] Int. Cl.² .......................................... B23P 19/08
[52] U.S. Cl. .................................................. 10/155 A
[58] Field of Search ............ 10/10 R, 155 R, 155 A, 10/162 R, 16 5, 169; 29/208 R, 211 R

[56] References Cited

U.S. PATENT DOCUMENTS

| 2,927,333 | 3/1960 | Stern | 10/155 A |
|---|---|---|---|
| 3,225,370 | 12/1965 | Pipes | 10/155 A |
| 3,622,039 | 11/1971 | Lindstrom | 10/155 A |
| 3,750,206 | 8/1973 | Pomernacki | 10/155 A |

FOREIGN PATENT DOCUMENTS

| 723,812 | 2/1955 | United Kingdom | 10/155 A |

*Primary Examiner*—E. M. Combs
*Attorney, Agent, or Firm*—Wenderoth, Lind & Ponack

[57] ABSTRACT

A machine for assembling screw blanks and washers includes a rotatable feed disc which continuously feeds washers in succession along a first path, the feed disc having a plurality of notches formed around the periphery thereof, each notch intended to receive a single washer. A rotatable turret continuously conveys screw blanks in succession along a second path in a plane parallel and vertically above the first path. The turret and feed disc are continuously rotated in opposite directions and in timed relationship such that screw blanks are conveyed in timed relationship to the feed of washers such that each screw blank is in turn brought into axial alignment with a respective washer. The turret includes a plurality of circumferentially spaced clamping heads each of which receives and clamps an individual screw blank. Each clamping head includes a relatively fixed jaw member having an open-ended slot adapted to receive the shank of a screw blank and a cooperating relatively movable jaw member which is resiliently biased towards the fixed jaw member to engage therebetween the head of the screw blank. Each clamping head is mounted for movement parallel to the axis of rotation of the turret. As each clamping head approaches a line containing the centers of rotation of the turret and feed disc at a position above the feed disc and substantially in alignment with a washer approaching such line, the clamping head is forced downwardly to thereby move and insert the screw blank into the washer.

12 Claims, 10 Drawing Figures

MACHINES FOR HANDLING AND ASSEMBLING FASTENERS AND WASHERS

FIELD OF THE INVENTION

This invention relates to machines for handling and assembling fasteners and washers.

Screw fasteners comprising an assembly of a screw and a captive but freely rotatable washer are in common use and large quantities are produced annually to satisfy the needs of industry. In the production of such fasteners, the washers are generally assembled with the screw blanks before the blanks are threaded.

DESCRIPTION OF THE PRIOR ART

Many machines have been proposed to assemble washers onto screw blanks and deliver the assembled blanks and washers either to a collection point or direct to automatic thread rolling machines. The majority of the assembly machines known and in current use employ means for feeding screw blanks and washers separately along converging paths. The feed is intermittent so that the screw blanks may be brought into axial alignment with the washers while the washers are temporarily stationary at which time the screw blanks are assembled with the washers.

The output of such machines is necessarily limited by the intermittent nature of the feed which in turn imposes considerable wear on the parts of the machine.

Other machines have been proposed in which screw blanks and washers are fed in succession along converging paths at uniform rates to a point where each blank is in turn in alignment with a washer but axially spaced from it, and at that point the blank is allowed to drop by gravity into the washer.

The reliance on gravity to perform the actual telescopic assembly of the screw blank and washer severely limits the output of such machines and even slight misalignment of the screw blank and the washer at the point of assembly will prevent the screw blank from dropping cleanly into the washer. The weight of the screw blank is a factor that very largely controls the output of the prior machines and whilst the operation of machines handling the larger sizes of fasteners is relatively reliable, the assembly of smaller size blanks of relatively little weight in such machines causes considerable problems. Output is limited and it is found to be extremely difficult to achieve consistent production of correct assemblies, a large number of imperfect assemblies or loose washers and screw blanks being discharged, so that the use of such machines to assemble small size screw blanks and washers is relatively inefficient.

Present day automatic thread rolling machines are designed for high speed operation, production rates of 400 – 700 thread rolled pieces per minute being not uncommon. The prior machines designed for assembly of washers and screw blanks generally do not achieve rates of assembly matching the capacity of such present day thread rolling machines and also tend to be suitable only for a limited range of components, change-over of the machines to operate with components of different form and/or size being difficult and very time consuming to achieve.

SUMMARY OF THE INVENTION

It is an object of the present invention to provide an improved machine for automatically assembling screw blanks and washers that is capable of assembling a wide range of screw blank and washer combinations and is also capable of achieving output rates matching those of available automatic thread rolling machines.

According to the invention a machine for assembling screw blanks and washers comprises means for continuously feeding washers in succession along a first path, means for continuously conveying screw blanks in succession along a second path in a plane parallel to the first path and in timed relationship to the feed of washers along the first path whereby each screw blank is in turn brought into axial alignment with a washer, means for clamping each screw blank individually in the conveying means, means to insert each screw blank in turn into a washer as the blank comes into alignment therewith to assemble the blank and the washer together, and means for withdrawing from the clamping means the blank having the washer assembled thereto.

In one constructive form of the invention the conveying means for the screw blanks comprises a rotatable turret incorporating a plurality of circumferentially spaced clamping heads each of which heads is adapted to receive and clamp an individual screw blank. Each clamping head suitably comprises a relatively fixed jaw member having an open-ended slot adapted to receive the shank of a screw blank and a co-operating relatively movable jaw member is resiliently biased towards the fixed jaw member to engage the head of a screw blank the shank of which is received within the slot in the fixed jaw member.

Screw blanks may be conducted to the turret along guide rails which terminate adjacent the turret. Means is provided to lift the relatively movable jaw member of each clamping head in turn and hold such movable jaw member away from the fixed jaw member while each clamping head in turn rotates into proximity with the end of the guide rails whereby as the head moves past the end of the guide rails a screw blank drops into the slot in the fixed jaw member. As soon as the clamping head has moved beyond the end of the guide rails and has received a screw blank, the movable jaw member is released and closes resiliently against the head of the screw blank to clamp the screw blank within the jaws. The means for lifting the movable jaw members may comprise a peg projecting from each movable jaw member and a fixed track disposed adjacent the periphery of the turret in position to cam each peg in turn as the turret rotates and each clamping head in turn approaches the end of the guide rails.

Preferably the means for feeding the washers comprises a feed disc mounted for rotation about an axis inclined at an acute angle to the vertical, whereby the plane of the feed disc is tilted out of the horizontal. The axis of rotation of the turret is parallel to the axis of rotation of the feed disc. The feed disc has around its periphery a plurality of notches each of which is adapted to receive a washer. The feed disc may be mounted to rotate over the face of a table and washers may be fed in bulk, and after selection and/or orientation as required e.g. in the case of cup washers, onto the table adjacent the periphery of the feed disc so that individual washers are collected in the notches in the feed disc as the feed disc rotates. Preferably the supply of washers onto the table is regulated to provide a surplus of washers for collection in the notches. The number of notches in the feed disc is the same as or a multiple of the number of clamping heads incorporated in the turret, and the feed disc and the turret are adapted to be continuously rotated in opposite directions by synchronous drive means. Thus, by rotation of the feed disc washers retained in the notches are fed along a circularly arcuate path. The clamping heads, as they rotate with the turret, convey the screw blanks clamped therein along a circularly arcuate path which overlaps the notches in the feed disc from above, and the speeds at which the feed disc and the turret rotate are so related that at the instant each clamping head traverses a line containing the centres of rotation of the turret and the feed disc a notch in the feed disc is also traversing the line, beneath the clamping head.

Each clamping head is mounted in the turret for movement parallel to the axis of rotation of the turret and such movement of the clamping heads is controlled by a fixed cam track associated with the turret. Each clamping head has a cam follower in engagement with the cam track and a spring acts between the clamping head and an axially fixed part of the turret to ensure that each cam follower remains in engagement with the cam track. The cam track has a high point substantially aligned with the end of the feed rails down which the screw blanks are delivered to the individual clamping heads, and a low point substantially opposite thereto.

After each clamping head in turn has picked up a screw blank from the feed rail, continuing rotation of the turret moves that head towards the line joining the centres of rotation of the turret and the feed disc. During the approach of the clamping head to the line along its arcuate path, the spring is moving the clamping head downwards as the cam track drops away and the end of the screw shank is thereby led to approach the plane of the feed disc from above. At the same time, a notch in the feed disc which retains a washer is also approaching the line along its arcuate path. The motions of the washer and the screw blank are such that as the end of the screw shank comes into axial alignment with the washer the shank has been lowered sufficiently to begin to enter the washer. This takes place in a zone just in advance of the traverse of the screw blank and the washer across the line joining the centres of rotation of the feed disc and the turret, and insertion of the screw shank into the washer by a continuing downward movement of the clamping head proceeds whilst the line is being crossed.

To withdraw the screw blank and washer thus telescopically assembled from the clamping head, a pair of parallel, downwardly inclined guide rails extend beneath the feed disc. The guide rails are spaced apart to allow the screw shanks to be received between them. The guide rails, or more particularly the gap between them, extends substantially tangentially to the periphery of the feed disc at the intersection thereof with the line joining the centres of rotation of the feed disc and the turret. The insertion of the screw blank into the washer thus also inserts the shank thereof between the rails so that continued motion of the feed disc, within the notch of which the washer is still engaged, feeds the screw blank and washer assembly along the guide rails and prises the head of the screw blank out of the clamping jaws. The assembly then slides along the guide rails, dropping out of the notch in the feed disc, and may proceed directly from the guide rails to an automatic thread rolling machine.

An imperfect assembly would result on any occasion a notch in the feed disc which did not contain a washer were to pass under a clamping head holding a screw blank if the screw blank were fed downwardly into the gap between the guide rails to be withdrawn thereby. Means are therefore provided to prevent such downward feed of a screw blank and withdrawal thereof in the event there is no washer present for assembly with the screw blank. Such means may comprise a detector member mounted on the machine and arranged to detect the presence or absence of a washer in a notch approaching the assembly zone and arranged to co-operate with a locking member associated with the clamping head to prevent downward feed of the clamping head in the event the notch does not contain a washer. The detector member may comprise a cranked lever pivotally mounted on a fixed part of the machine base and spring-loaded such that one arm thereof projects into the path of travel of the notches ahead of the assembly zone, whereas the other arm is arranged to co-operate with the locking member on the turret. There is a locking member associated with each clamping head, and the locking members are pivotally mounted for movement between a tripped position in which they are engaged beneath their respective clamping heads to prevent the heads feeding downwardly on approach to the assembly zone, and a cleared position in which the locking members do not interfere with the feed movement of the head.

When a notch which does not contain a washer reaches the detector member, the arm thereof drops into the notch and the member pivots to bring its other arm into a position to engage and trip the locking member of the approaching clamp head to lock the head. The screw blank carried in the clamping head is thus taken past the assembly zone without being fed downwardly and remains clamped in the head. Once clear of the assembly zone, a release member engages and resets the locking member to cleared position so that the screw blank still clamped in the head is available for assembly with a washer the next time round.

The approach to the assembly zone of a notch on the feed disc which does contain a washer does not cause operation of the locking member. The washer in the notch pivots the detector member into a position in which its other arm is out of the range of the locking member which in consequence is not tripped.

In the event a notch containing a washer reaches the assembly zone and the approaching clamping head does not carry a screw blank, the washer will simply be carried further around by the feed disc until it will slide out of the notch and off the feed disc. Such a washer, and others supplied to the disc and not collected in the notches but which have slid down over the sloping face of the disc, are collected and preferably recycled.

Preferably the fixed clamping jaws are detachably mounted to allow of their replacement as required by alternative jaws adapted to receive an alternative size of screw blank. Also the feed disc is preferably detachably mounted to allow for it to be removed and replaced by any one of a number of alternative discs the notches of which are adapted to receive other styles or size of washer. All of the feed discs have the notches positioned such that the diameter of the pitch circle of the centres of the apertures in the washers collected in the notches is the same, and also all of the clamping jaws are designed to hold the various screw blanks on a pitch circle of constant diameter. The diameters of the two pitch circles are such that a common tangent can be drawn thereto at the line joining the centres of rotation of the turret and the feed disc. In this way interchangeability of the feed discs and clamping jaws to accommodate different styles and sizes of washers and screw blanks is ensured without the need to reposition the centres of rotation to effect a change-over of the machine to assemble a different combination of screw blank and washer.

The respective guide rails along which the screw blanks are supplied to the turret and those along which the assemblies are withdrawn and discharged are preferably also adjustable as to their gap widths to accommodate different sizes of screw shank.

In addition the cam track associated with the turret is preferably rotationally adjustable to allow for blanks of different shank length.

Ready change-over of the machine from one style or size of screw blank/washer assembly to another is thus achieved by simple replacement of and/or adjustment of very few parts.

A preferred embodiment of a machine according to the invention for assembling screw blanks and washers will now be more particularly described, reference being made to the accompanying generally schematic drawings.

Figure 1:
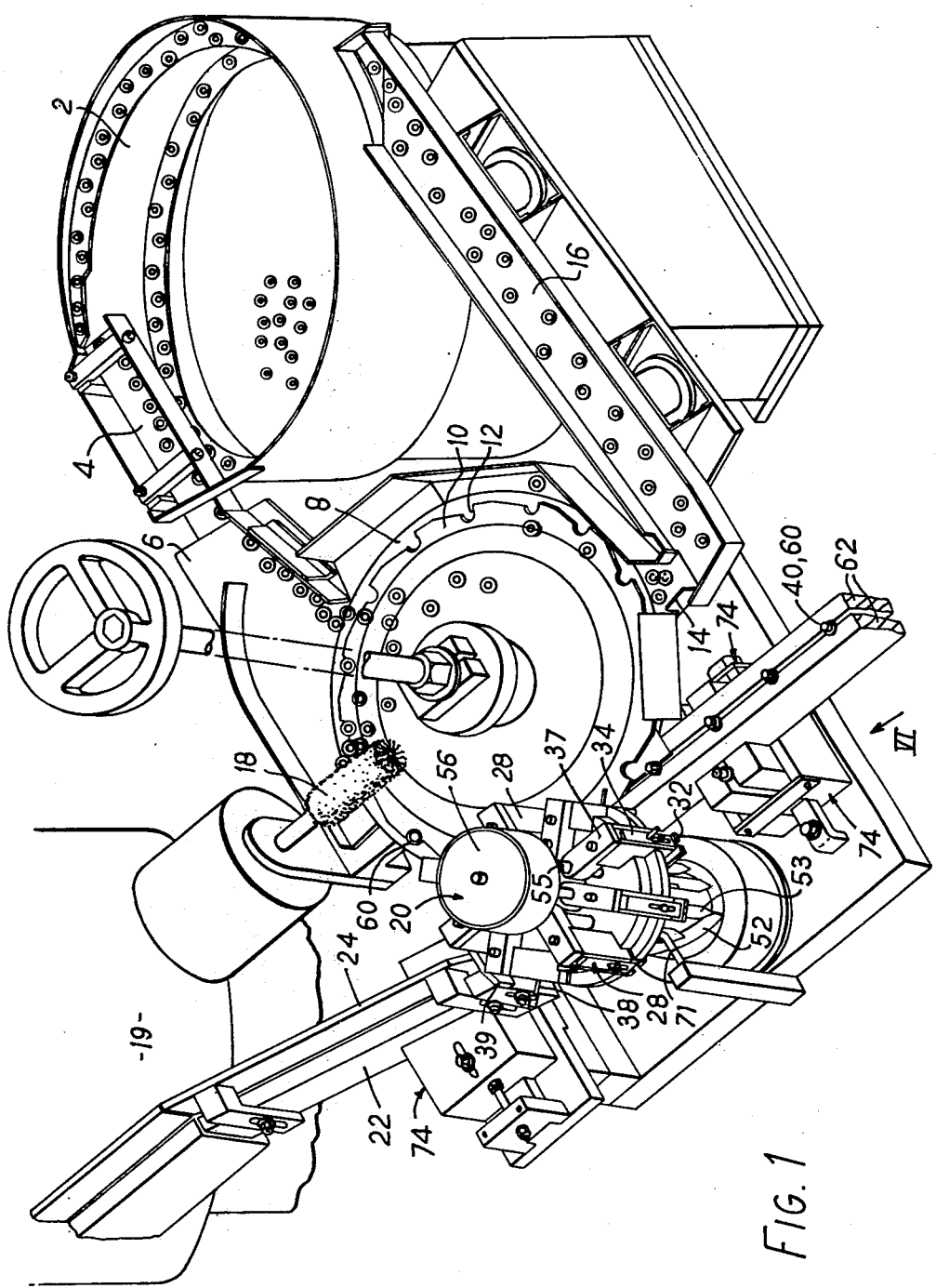
FIG. 1 is an isometric view of the machine.

DESCRIPTION OF THE PREFERRED EMBODIMENT.

Washers from a random bulk supply are fed by a vibratory feed bowl 2 onto a selecting and/or orienting plate 4 equipped as necessary with shaped holes or projections to select and orient the washers. Washers selected and/or oriented on plate 4 are fed to a linear vibratory feed plate 6 which discharges the washers onto a table 8.

Although the washers illustrated are of concentric circular form, and the assembly of a single washer to each screw blank will be described, the machine is capable of assembling non-circular or asymmetric washers or a multiplicity of washers to the screw blanks.

A washer feed disc 10 is mounted to rotate over the face of table 8. The periphery of the disc is formed with a series of equally spaced washer collecting and retaining notches 12, disc 10 illustrated having sixteen notches 12. The axis of rotation of disc 10 is inclined at an acute angle to the vertical such that the general plane of the disc 10 is inclined to the horizontal. Feed plate 6 discharges the washers onto table 8 in the region of the highest point of the table. Disc 10 rotates anti-clockwise as viewed in FIG. 1, and as it rotates washers are collected in the notches 12 and carried round with the disc. Washers are discharged by feed plate 6 at a substantially greater rate than they are collected in the notches 12 so that many washers will slide across the face of the feed disc 10 and be discharged from the lowest point of table 8 by a chute 14 onto a vibratory linear feeder 16 which conveys the washers back into the feed bowl 2 whence the washers are recycled.

Any surplus washers being carried round on the top of the feed disc 10 are swept off by a rotating brush 18 and slide down to chute 14 for recycling. Brush 18 ensures that each notch 12 in turn, as it passes out beneath the brush, contains only the desired single washer.

The washers contained in notches 12 are fed by the rotation of the feed disc 10 along the circularly arcuate path of trvel of the notches to be assembled with screw blanks.

The screw blanks are fed from a conventional hopper 19, only schematically represented in FIG. 1, in which they are oriented shank down, to a conveying means 20 for assembly with the washers. The screw blanks are fed in line down a pair of parallel inclined guide rails 22 spaced apart a sufficient distance to allow the shanks to hang between them while their heads are supported on the rails 22. A third rail 24, see FIG. 5, is mounted above the gap between the rails 22 a sufficient distance just to allow clearance for the heads of the blanks and prevent them lifting up from proper feeding position.

Figure 3:
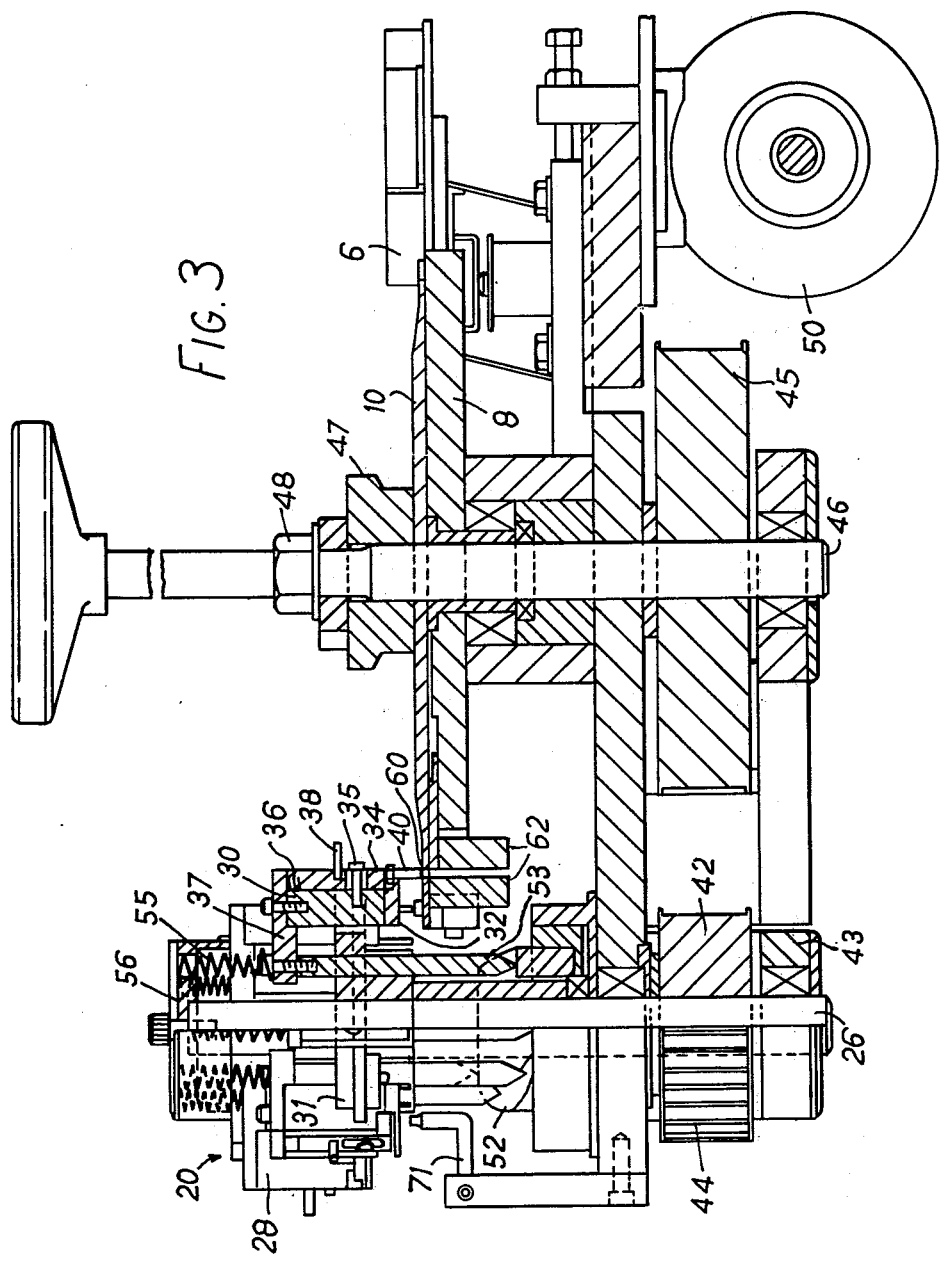
FIG. 3 is a part-sectional elevation on line III—III in FIG. 2.
Figure 4:
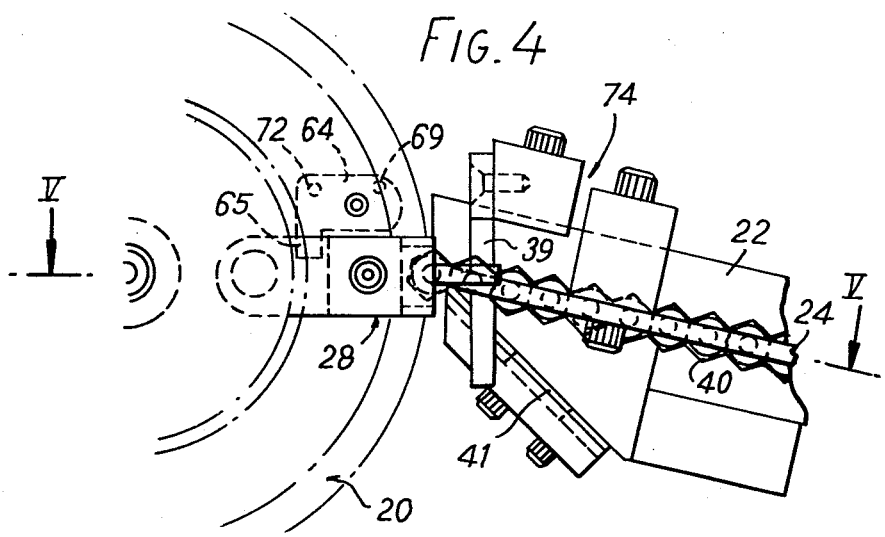
FIG. 4 is a fragmentary plan view, to an enlarged scale showing part of the guide rails along which screw blanks are fed to the turret, only one clamping head being shown.

Conveying means 20 comprises a turret mounted on a shaft 26, FIG. 3, for rotation about an axis parallel to the axis of rotation of the feed drive 10. Turret 20 incorporates a plurality of clamping heads 28 equally spaced about the circumference of the turret. The clamping heads 28 are all identical. Each head 28 comprises a block 30 slidably received within a slot 29 in a disc 31 rigidly mounted on shaft 26 so that the clamping head may rise and fall in the axial direction while being constrained to rotate with the turret.

Figure 5:
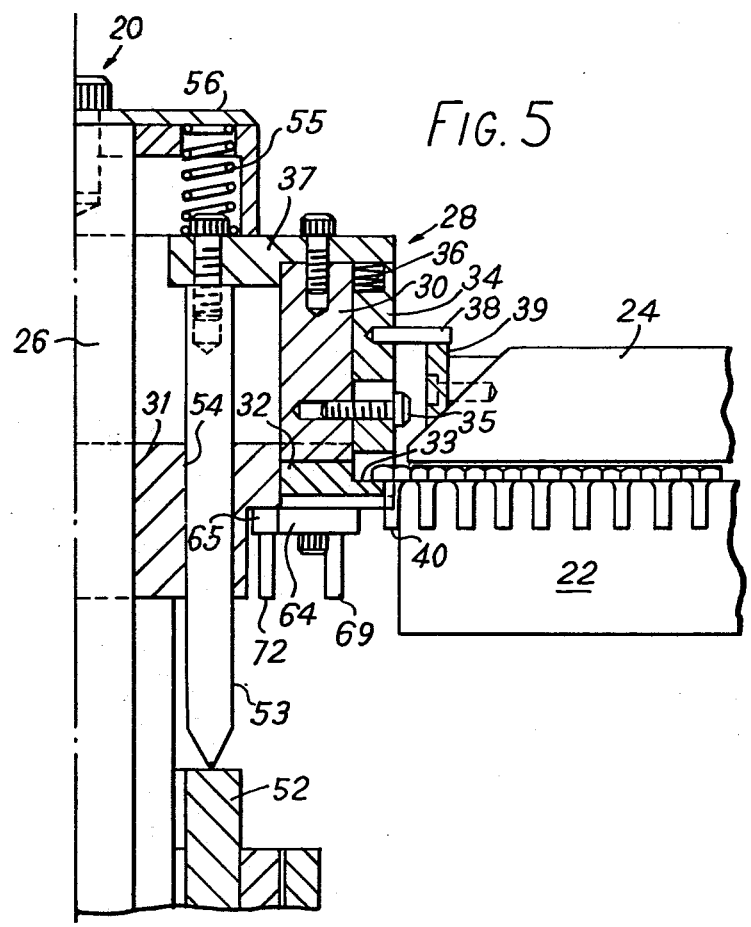
FIG. 5 is a cross-sectional view on line V—V in FIG. 4.

The lower end of block 30, see particularly FIGS. 3 and 5, has bolted or otherwise removably secured thereto a fixed jaw member 32 having therein an open-ended slot or recess 33. A movable jaw member 34 is slidably mounted on block 30 by means of a screw 35 to co-operate with the fixed jaw member 32 towards which it is constantly urged by a spring 36 interposed between the jaw member 34 and a plate 37 bolted to the upper end of block 30. A pge 38 projects radially outwardly from movable jaw member 34.

Guide rails 22 end adjacent the turret 20. As the turret 20 rotates, clockwise in FIG. 1, the clamping heads 28 move in succession past the end of the guide rails 22. As each clamping head 29 approaches the end of the guide rails 22, the peg 38 engages and rides up an arcuate track 39 fixed to the guide rails 22, FIGS. 1, 2, 4 and 5, to lift the movable jaw member 34 away from the fixed jaw member 32. A screw blank 40 at the leading end of the rails 22 is thereupon free to drop into the slot 33 in the fixed jaw member. Any attempt by the screw blank 40 to bounce back out of the slot 33 is prevented by a spring blade 41 which is also effective to eject any blank which may not correctly enter the slot. Peg 38 drops off the end of track 39 when the turret 20 has rotated the clamping head 28 a short distance past the end of the guide rails 22 and spring 36 closes the movable jaw member 34 down onto the head of the screw blank received within the jaws to clamp the screw blank in head 28.

Figure 2:
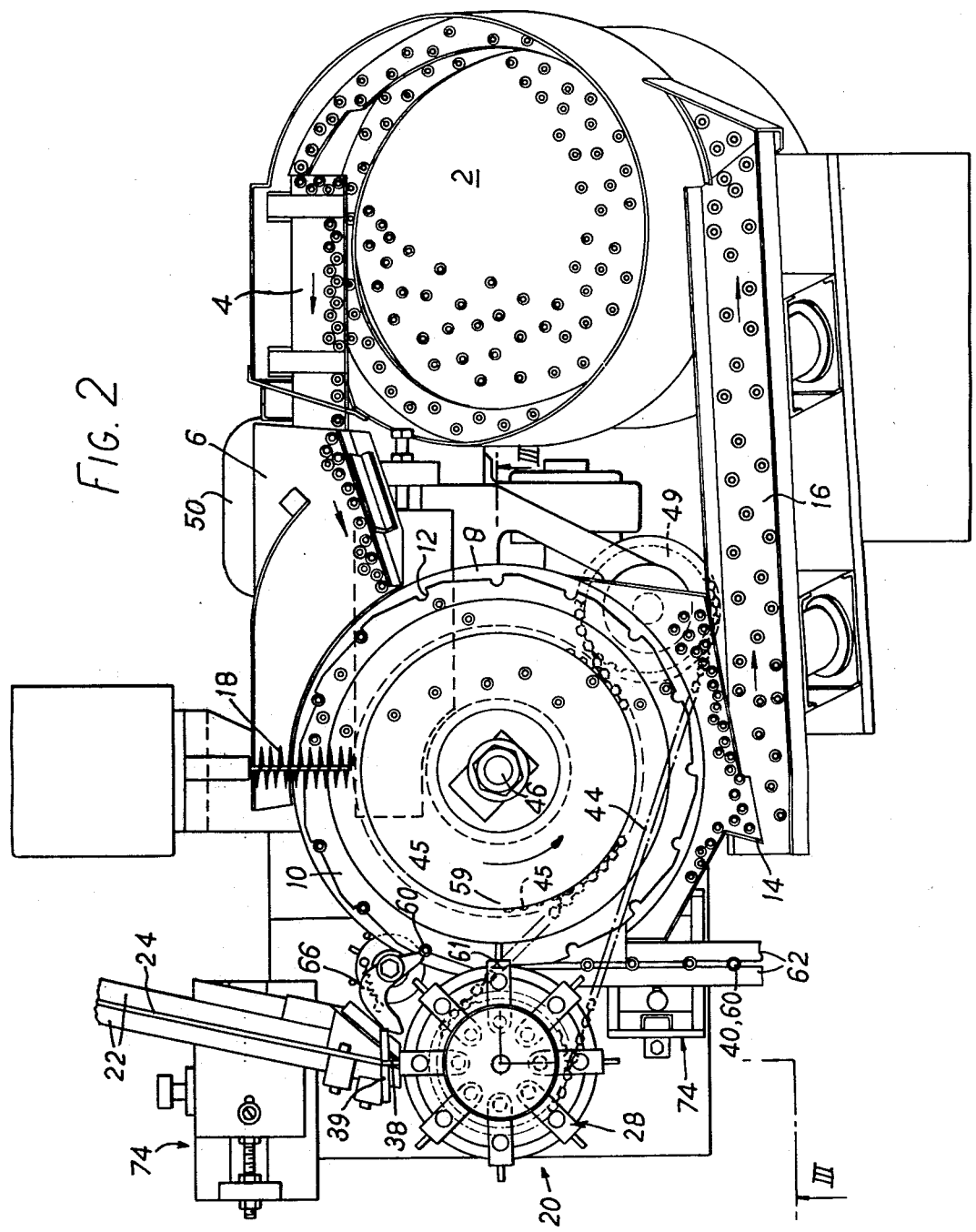
FIG. 2 is a view of the machine from above.

Rotation of the turret 20 feeds the screw blanks clamped in the respective heads 28 along a circularly arcuate path for assembly with the washers being fed by the feed disc 10. The turret 20 and the feed disc 10 are rotated in timed relationship so each screw blank in turn is brought in to axial alignment with a washer for assembly therewith. Any suitable drive means for rotating the turret 20 and the feed disc 10 may be employed. FIGS. 2 and 3 illustrate a toothed pulley 42 mounted on turret shaft 26 and driving the shaft through a friction coupling 43 to avoid damage to the mechanisms in the event of a serious jam. A driving belt 44 having timing teeth on both sides is engaged with pulley 42 and a toothed pulley 45 keyed to a shaft 46 to which the washer feed disc 10 is removably connected for rotation by washers 47 and a nut 48. Belt 44 is driven by a pulley 49 from an electric motor 50 incorporating reduction gearing. Disc 10 as shown has 16 notches 12 and turret 20 has eight clamping heads 28 and thus disc 10 is rotated at half the speed of turret 12.

A non-rotating helical cam 52 is fixed surrounding the turret shaft 26. Each clamping head has a cam follower 53 fixedly connected to upper plate 37 and projecting downwardly through a guide hole 54 in the disc 31 to contact the cam 52. A spring 55 is provided between head plate 37 and an end cap 56 bolted to the outer end of shaft 26. As the turret 20 rotates, cam 52 lifts each clamping head 28 in turn as the head approaches the end of the guide rails 22, compressing spring 55, and lowers the head 28 as it moves away from the guide rails 22. The cam 52 can be moved rotationally for adjustment.

Figure 7:
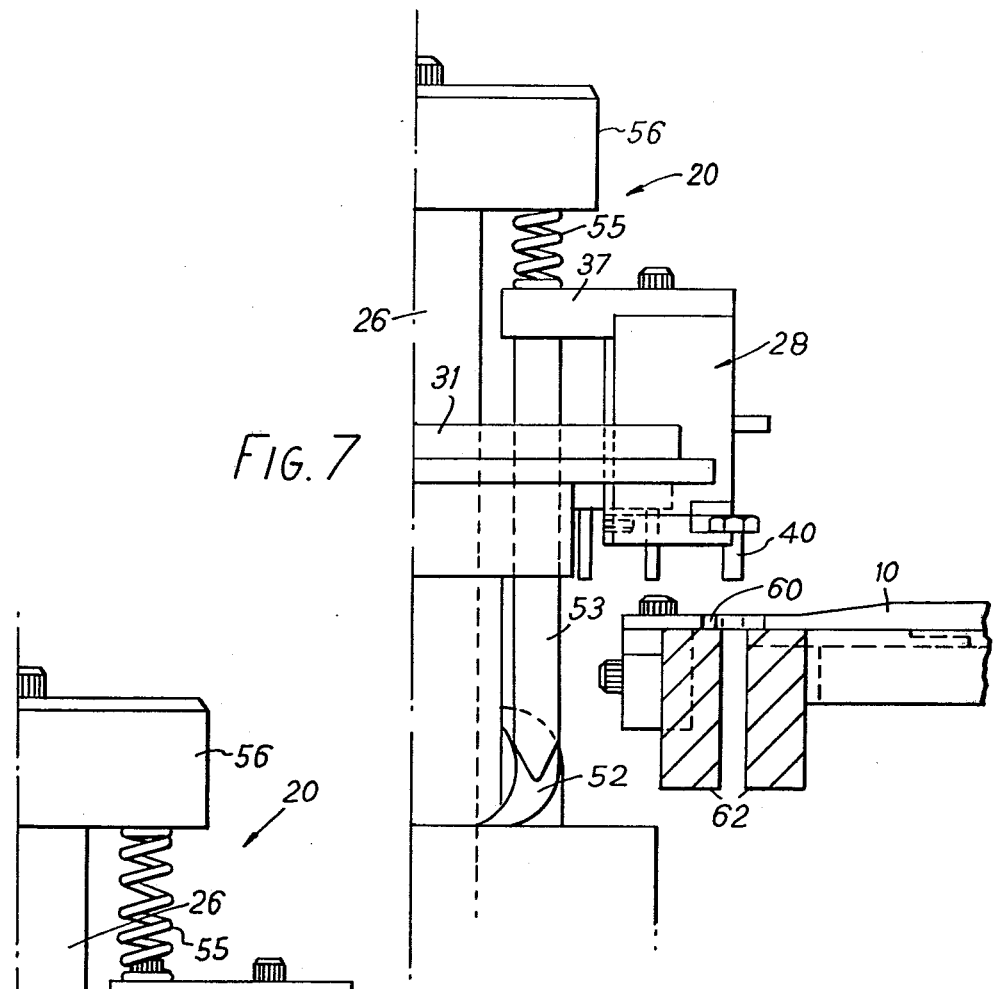
FIG. 7 is a fragmentary elevation showing a screw blank just prior to telescopic assembly with a washer.

Consider a clamping head 28 which has picked up a screw blank 40 from the guide rails 22, FIG. 5. The head is at the highest position to which cam 52 raises it. Rotation of the turret 20 is advancing that head towards traverse across a line 59, FIG. 2, joining the centres of rotation of the turret 20 and the feed disc 10. At the same time, the head 28 is moving downwardly under the action of spring 55 as the cam 52 drops away, and a notch 12 containing a washer 60 is approaching traverse of line 59 but at a lower level. The notches 12 on feed disc 10 are laid out, and the clamping heads 28 on turret 20 are so disposed, in relation to the distance between the centres of rotation of the feed disc 10 and the turret 20 that the pitch circle of the centres of the apertures of the washers 60 in the notches, and the pitch circle of the centres of the shanks of the blanks 40 clamped in the heads 28, have a common tangent at the point 61, FIG. 2, where the pitch circles intersect the line 59. The blank 40 and the washer 60 therefore approach point 61 along converging paths in the same direction, the blank 40 also moving downwardly towards the washer 60 from above, see FIG. 7.

Figure 8:
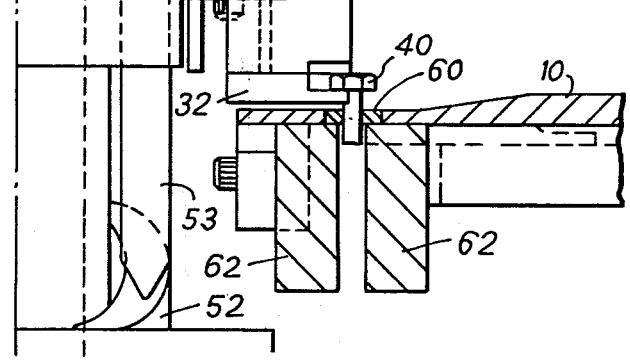
FIG. 8 is a view similar to FIG. 7 but showing the assembly.

The blank 40 and the washer 60 come substantially into axial alignment shortly before the point 61 is reached, and the shank of blank 40 is positively inserted into the washer by the driving action of spring 55 as follower 53 runs down cam 52. A pair of parallel guide rails 62, similar to rails 22, extend beneath the feed disc 10 substantially from point 61 such that the centre line of the gap between the rails 62 is substantially along the common tangent to the pitch circles. As the screw blank 40 is telescoped further with the washer 60 the shank thereof enters the gap between rails 62. The screw blank is still held by the clamping jaws 32, 34, and continuing rotation of turet 20 forces the blank and washer assembly along the rails 62, FIG. 8, thus prising the blank and the washer respectively out of the clamping jaws 32, 34 and the notch 12 until the assembly becomes free. The rails 62 are inclined downwardly and the assemblies slide down the rails 62 which may lead directly to an automatic thread rolling machine (not shown).

It will be understood that in the machine of the invention the screw blanks and the washers are fed continuously for assembling the one with the other, and that telescopic assembly occurs over a short zone or distance extending to either side of point 61 and not just at a specific point. Each screw blank is positively inserted into a washer, and assembly does not rely on gravity.

From time to time it may happen that a clamping head will not pick up a screw blank from the feed rails 22. Any loose washers not assembled with screw blanks remain in the notches 12 and are carried round by rotation of the feed disc 10 until they drop out of the notches and pass out over chute 14 for recycling back to the washer feed bowl 2.

Also it may happen that a notch 12 will reach the assembly zone without containing a washer. In this event no screw blank is pushed down into the discharge rails 62. A locking member 64 is pivotally mounted on the turret disc 31 adjacent each clamping head 28. Locking member 64 is pivotable between a cleared position, shown in FIG. 9, in which an integral arm 65 thereof is swung out of the path of axial movement of the associated clamping head 28, and a tripped position, shown in FIG. 10, in which the arm 65 projects beneath the lower fixed jaw 32 to lock the clamping head in its upper position. (Not all of the clamping heads 28 on the turret 20 are shown in FIGS. 9 and 10 to avoid confusing detail).

A cranked detector member 66 is pivotally mounted on the machine and has an arm 67 arranged to ride on the periphery of the feed disc 10 and detect the presence or absence of a washer 60 in a notch 12 approaching the assembly zone and an arm 68 arranged to trip the locking member 64 of a clamping head 28 which has rotated past the end of the feed rails 22 and will arrive at the assembly zone at the same time as the notch. Arm 68 trips locking member 64 by striking against a peg 69 depending from the locking member.

Figure 9:
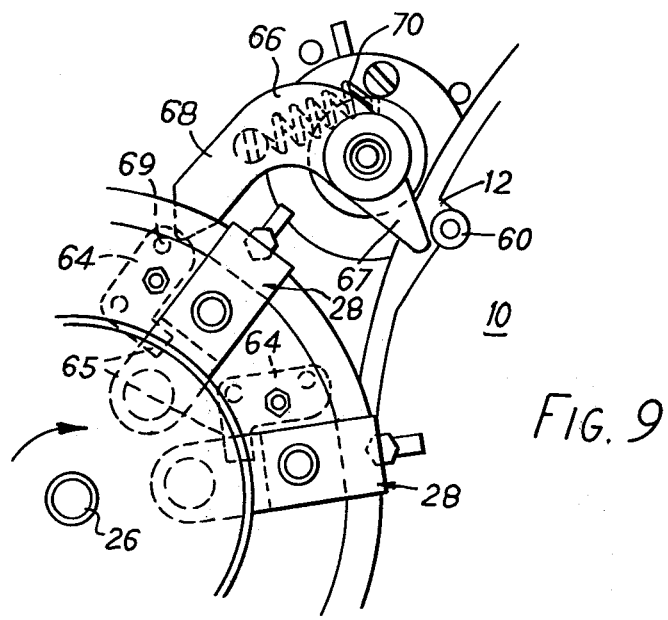
FIG. 9 is a fragmentary plan view showing means for preventing an incorrect assembly and
FIG. 10 is a fragmentary plan view similar to FIG. 9 showing the means in operation.

In FIG. 9 the notch 12 contains a washer 60. Engagement of washer 60 with arm 67 has pivotted member 66 against the force of a spring 70 and has moved arm 68 out of the range of the peg 69. Locking member 64 is therefore not tripped and assembly of the screw blank and washer proceeds normally.

Figure 10:
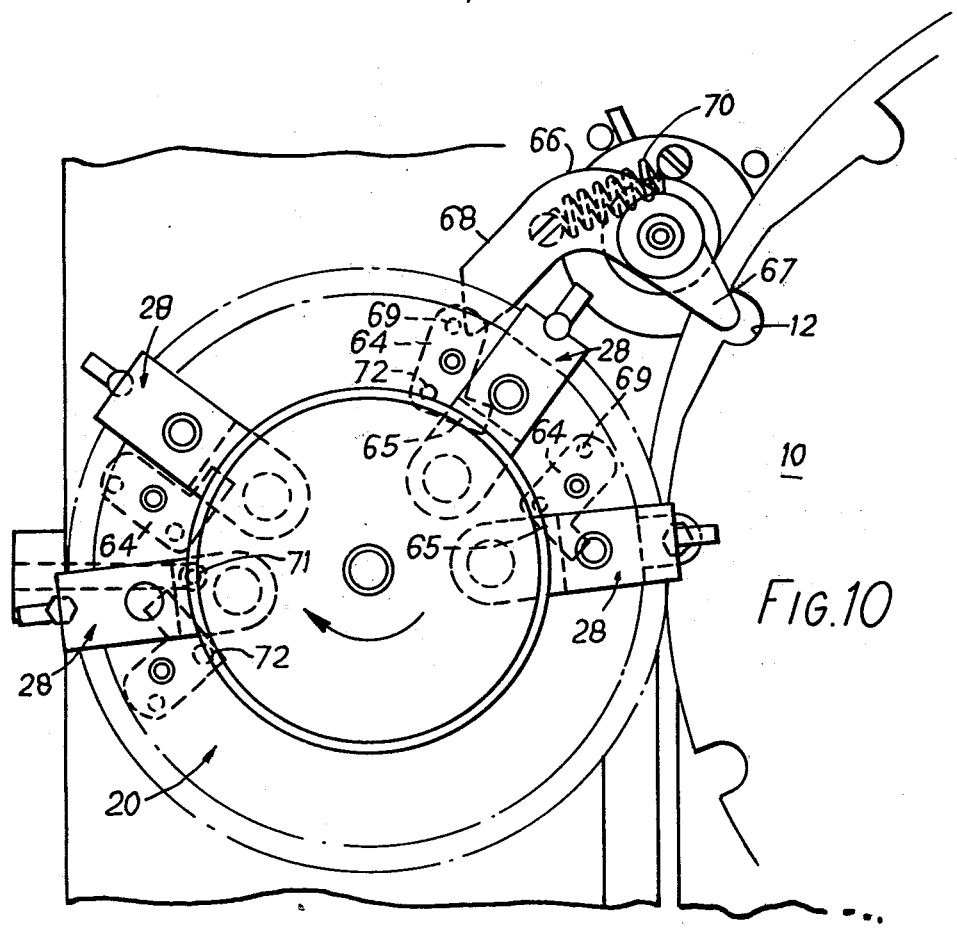

In FIG. 10 the notch 12 does not contain a washer. Spring 70 has caused arm 67 to drop into the empty notch 12 and the resultant pivotal movement of the detector member 66 has brought its other arm 68 into position to contact trip peg 69 of locking member 64 as the turret 20 rotates to bring the associated clamping head 28 past the detector member.

Contact of peg 69 with arm 68 pivots locking member 64 to bring arm 65 thereof beneath jaw 32 thus keeping the clamping head 28 in the raised position as it rotates past the assembly zone. The screw blank remains held between the clamping jaws 32, 34, is not deposited on the discharge rails 62 and is carried round in the clamping head.

Figure 6:
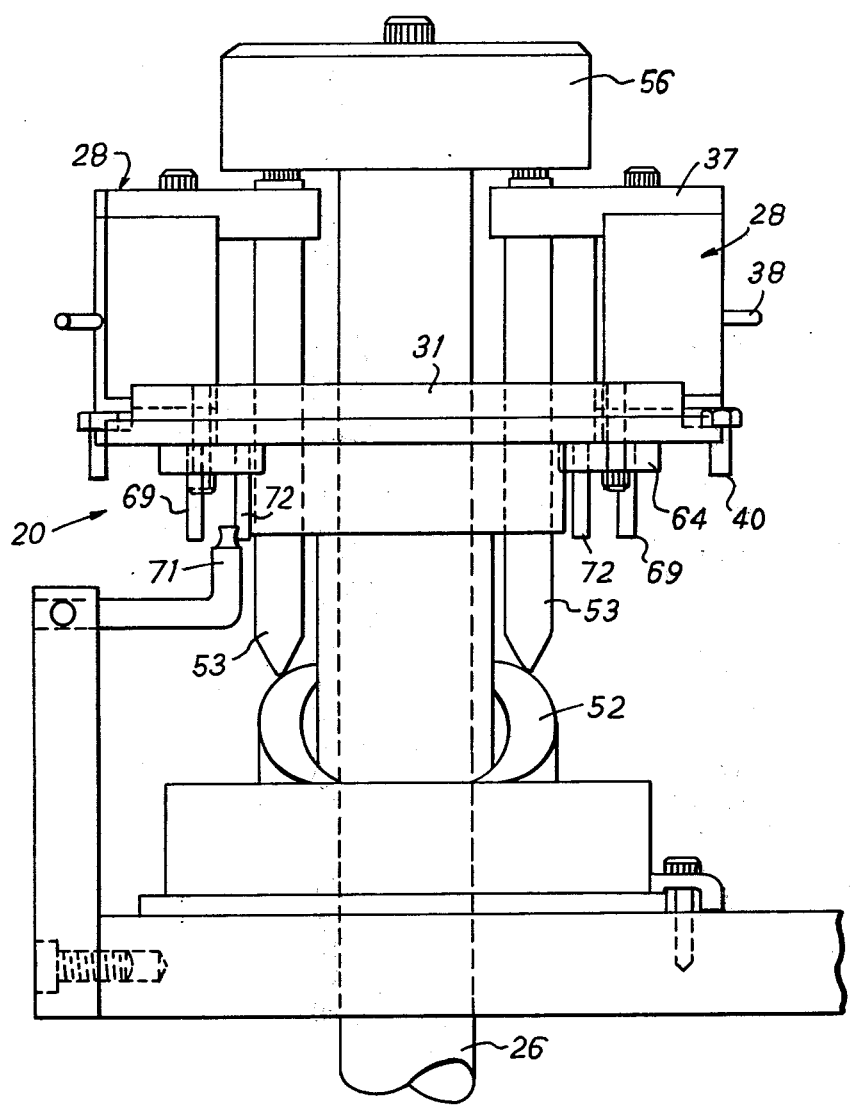
FIG. 6 is an elevation of the turret, looking in the direction of arrow VI in FIG. 1, and to a larger scale, the three clamping heads facing forwardly being omitted for greater clarity.

Positioned substantially opposite to the detector member is a release member 71, FIGS. 1 and 6, which engages a clearing peg 72 on any locking member 64 that has been tripped and returns the locking member to the cleared position (see locking member 64a in FIG. 10) so that the unassembled screw blank carried by the associated clamping head is rendered available for assembly with a washer on the next approach of the clamping head to the assembly zone.

It will be seen from FIG. 2 that the screw blank feed rails 22 do not extend radially of the turret 20 but at an acute angle to the radial direction. This prevents an unassembled screw blank that is being carried around in a clamping head from jamming against the leading screw blank in the stack along the guide rails 22 and stopping the operation of the machine.

The machine may readily be adapted to produce assemblies of other form or size simply by removing the fixed clamping jaws 32 and the feed disc 10 and replacing them by other clamping jaws and a disc appropriate for the different form or size of assembly to be produced. A stock of replacement clamping jaws and feed discs may be provided for this end. Provided that the above described pitch circle relationship is maintained the jaws and discs may be changed at will, and no adjustment or repositioning of the centres or axes of rotation of the turret and the feed disc are required. This considerably simplifies the design and cost of the machine.

The guide rails 22 and 62 are held in mountings 74, FIG. 1, which are adjustable to alter the gap widths between the respective rails to receive screw blanks of different shank size. The mountings are such that adjustment can be performed by altering positions of the rails in equal amounts either side of the centre line of the gap so that alignment of the respective gaps is preserved.

Detector member 66 is preferably set such that the presence in a notch 12 of the smallest size of washer which it is desired to use on the machine pivots the detector member sufficiently to move arm 68 out of the range of the pegs 69 on the locking members 64. No alteration to or adjustment of the detector member is required in consequence when the washer size is changed.

It will be seen that there has been disclosed a machine for handling and assembling screw blanks and washers which numbers among its many features and advantages the following:

a. Selection and orientation of washers and transport to an assembly zone,
b. Selection and orientation of screw blanks and conveyance to an assembly zone,
c. positive telescopic assembly of the screw blanks and washers and discharge of the assemblies,
d. detection of incorrect assembly conditions and prevention of faulty assemblies,
e. Collection and recycling of surplus unassembled washers,
f. Recycling of unassembled screw blanks,
g. Production of assemblies at rates comparable to those of automatic thread rolling machines,
h. Adaptability to handle a wide range of different screw blank and washer combinations with only simple changes to set up components.

I claim:

1. A machine for assembling screw blanks and washers, said machine comprising:

a rotatable feed disc means for continuously feeding washers in succession along a first path, said feed disc means having a plurality of notches formed around the periphery thereof, each notch being adapted to receive a single washer;

rotatable turret means for continuously conveying screw blanks in succession along a second path in a plane parallel to and vertically above said first path;

drive means for continuously rotating said turret means and said feed disc means respectively in opposite directions and in timed relationship such that said screw blanks are conveyed in timed relationship to the feed of washers along the first path such that each screw blank is in turn brought into axial alignment with a respective washer;

said turret means including a plurality of circumferentially spaced clamping heads each of which heads is adapted to receive and clamp an individual screw blank therein, each said clamping head comprising a relatively fixed jaw member having an open-ended slot adapted to recieve the shank of a screw blank and a cooperating relatively movable jaw member resiliently biased towards the respective said fixed jaw member to engage the head of a screw blank the shank of which is received within said slot in said respective fixed jaw member, means mounting each clamping head in said turret means for movement parallel to the axis of rotation of the turret means, and means for moving each said clamping head containing a screw blank downwardly as said clamping head approaches a line containing the centers of rotation of said turret means and said feed disc means at a position above said feed disc means and substantially in axial alignment with a washer approaching said line and moving along said first path and thereby moving and inserting the screw blank into the washer, thereby assembling the screw blank and the washer; and means for withdrawing from said clamping head the blank having the washer assembled thereto.

2. A machine as claimed in claim 1, further comprising means for supplying screw blanks to said turret means and means for lifting said relatively movable jaw member of each said clamping head in turn away from the respective said fixed jaw member and for holding said movable jaw member in such thus lifted position while said clamping head rotates towards said supply means.

3. A machine as claimed in claim 2, wherein said supply means comprises guide rails along which screw blanks are fed, and said means for lifting said movable jaw members comprises a peg projecting from each said movable jaw member, and a fixed track disposed adjacent the periphery of said turret means to cooperate with each said peg in turn and lift the associated said movable jaw member as the respective said clamping head approaches the end of said guide rails, said track releasing each said peg after the respective said clamping head has rotated beyond the end of said guide rails to permit the respective said movable jaw member to close resiliently toward the respective said fixed jaw member for clamping a screw blank therebetween.

4. A machine as claimed in claim 3, wherein said feed disc means is mounted for rotation about an axis inclined at an acute angle to the vertical, whereby the plane of said feed disc means is tilted out of the horizontal, and the axis of rotation of said rotatable turret means is parallel to said axis of rotation of said feed disc means.

5. A machine as claimed in claim 1, wherein said means for moving said clamping heads parallel to the axis of rotation of said turret means comprises a cam follower mounted on each clamping head, spring means acting between an axially fixed member on said turret means and each clamping head for urging said clamping head downwardly and for thus urging the respective said follower into engagement with a stationary helical cam track.

6. A machine as claimed in claim 5, wherein said stationary cam track has a high level substantially aligned with said screw blank supply means and a low level circumferentially spaced therefrom.

7. A machine as claimed in claim 6, wherein as each said clamping head in turn conveys the screw blank clamped therein into alignment with a washer retained in a notch in said feed disc means, said spring means feeds said clamping head downwardly parallel to said axis of rotation of said turret means to insert the screw blank into the washer.

8. A machine as claimed in claim 7, further comprising a locking member means associated with each clamping head, and detector means for detecting the presence or absence of a washer in a notch approaching the assembly zone and arranged to cooperate with said locking member means to prevent downward feed of a clamping head in the event the respective notch does not contain a washer, said detector means comprising a cranked lever having first and second arms and pivotally mounted such that said first arm thereof projects into the path of travel of said notches ahead of the assembly zone and said second arm thereof is arranged to cooperate with said locking member means.

9. A machine as claimed in claim 8, wherein said locking member means associated with each clamping head comprises a member pivotally mounted for movement between a tripped position in which said member is engaged beneath the respective said clamping head to prevent said head from moving downwardly, and a cleared position in which said member does not interfere with movement of said clamping head.

10. A machine as claimed in claim 9, wherein the absence of a washer from a notch causes said cranked detector lever to pivot to cause said second arm thereof to project into a position to engage and trip said locking member means of the approaching clamping head to the tripped position thereof.

11. A machine as claimed in claim 9, further comprising a release member means for engaging a locking member which has been moved to the tripped position thereof to reset said locking member to the cleared position thereof after the respective said clamping head has moved out of the assembly zone.

12. A machine as claimed in claim 1, wherein said notches on said feed disc means are positioned such that the diameter of the pitch circle of the centers of the apertures in the washers collected in said notches has a common tangent with the pitch circle of the screw blanks clamped in the clamping jaws in said turret means, at said line joining said centers of rotation of said turret means and said feed disc means.

* * * * *